United States Patent Office 3,646,066
Patented Feb. 29, 1972

3,646,066
ADAMANTYLAMINO-TETRAHYDRONAPHTHYL-OXYPROPANOLS AND ESTER DERIVATIVES
Venkatachala Lakshmi Narayanan, North Brunswick, and Jack Bernstein, New Brunswick, N.J., assignors to E. R. Squibb & Sons, Inc., New York, N.Y.
No Drawing. Filed Mar. 25, 1970, Ser. No. 22,663
Int. Cl. C07c 93/00, 93/26
U.S. Cl. 260—343.7
13 Claims

ABSTRACT OF THE DISCLOSURE

This invention relates to new adamantylamino-5,6,7,8-tetrahydronaphthyloxypropanols and related compounds of the formula

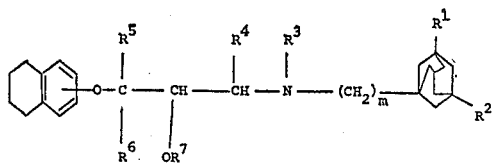

and to salts of such compounds, products which are useful in coronary diseases and as antiviral agents.

SUMMARY OF THE INVENTION

This invention relates to new chemical compounds of the formula (I)

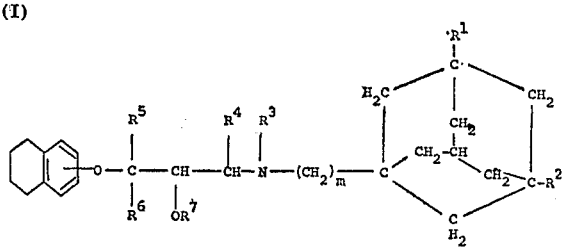

wherein $R^1$ and $R^2$ each is hydrogen, lower alkyl or lower alkoxy,
$R^3$ is hydrogen, lower alkyl, hydroxy-lower alkyl, lower alkenyl or phenyl-lower alkyl,
$R^4$, $R^5$ and $R^6$ each is hydrogen or lower alkyl,
$R^7$ is hydrogen or the acyl radical of a hydrocarbon carboxylic acid of less than 14 carbon atoms, and
$m$ is 0, 1 or 2, and salts of those compounds.

DETAILED DESCRIPTION OF THE INVENTION

In Formula I, the lower alkyl groups represented by the various symbols include straight and branched chain saturated hydrocarbon groups such as methyl, ethyl, propyl, isopropyl, butyl, isobutyl, t-butyl, amyl and the like. The lower alkenyl groups are monounsaturated radicals of the same type. The lower alkoxy groups are oxygen containing radicals of the same character, e.g., methoxy, ethoxy, propoxy, isopropoxy and the like. The phenyl-lower alkyl groups also include similar alkyl groups, e.g., benzyl, phenethyl and the like.

The acyl radicals represented by $R^7$ include lower fatty acid radicals, e.g., acetyl, propionyl, isobutyryl, butyryl, as well as long chain fatty acid radicals such as hexanoyl, heptanoyl, decanoyl, dodecanoyl and the like, aryl, aralkanoic acid radicals such as benzoyl, phenacetyl and the like, and 1-adamantane carbonyl and adamantanealkanoyl radicals.

As indicated, the adamantyl ring may be unsubstituted or contain one or two substituents of the type described. The adamantane ring may be joined directly to the nitrogen atom or through a one or two carbon atom chain.

The various substituents R may be the same or different in a given compound.

The compound of Formula I form acid addition salts with inorganic and organic acids. These acid addition salts frequently provide useful means for isolating the products from reaction mixtures by forming the salt in a medium in which it is insoluble. The free base may then be obtained by neutralization, e.g., with a base such as sodium hydroxide. Then any other salt may again be formed from the free base and the appropriate inorganic or organic acid. Illustrative are the hydrohalides, especially the hydrochloride and hydrobromide which are preferred, sulfate, nitrate, phosphate, borate, acetate, oxalate, tartrate, maleate, citrate, succinate, benzoate, ascorbate, salicylate, lactate, methanesulfonate, benzenesulfonate, toluenesulfonate and the like.

Preferred are those compounds wherein $R^1$, $R^2$, $R^3$, $R^4$, $R^5$ and $R^6$ are all hydrogen, $R^7$ is hydrogen or acetyl and $m$ is 0, especially when the side chain is attached to the 1-position of the fused ring.

The compounds of this invention are useful as antiviral agents in warm blooded animals, like household animals, e.g., against influenza virus such as A-PR8 or hepatic virus such as MHV₃, by oral or parenteral, e.g., i.p. administration at doses of about 10 to 90 mg./kg./day divided in four to six doses. For example, in mice about 15 mg./kg./day, orally, are used. For this purpose a compound of Formula I or a physiologically acceptable acid addition salt may be incorporated in a conventional dosage form such as tablet, capsule, elixir, injectable or the like along with the necessary carrier material, excipient, lubricant, buffer or the like.

They are also useful as antifibrillatory agents, for example, in arresting cardiac arrhythmia in warm blooded animals, e.g., by inhibition of beta adrenergic receptors in the myocardium. Single or divided doses of about 5 to 25 mg./kg./day, preferably 4 to 10 mg./kg., two to four times daily may be administered in dosage forms as described above. They are also useful as antihypertensive agents, e.g., at 10 mg./kg., i.p. in the rat.

The products of Formula I may be produced by either of two methods described below. The symbols have the same meanings described above.

According to the preferred method, a naphthol of the formula (II) 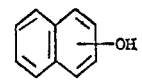

is reduced with a metal like lithium or sodium in liquid ammonia containing an alcohol such as ethanol, isopropanol, t-butanol or the like followed by further hydrogenation with palladium on carbon [e.g., by the procedure described in Organic Syntheses, Coll. vol. 4, page 877 (1963)] to obtain the 5,6,7,8-tetrahydronaphthol of the formula (III) 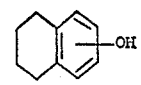

The compound of Formula III is made to react with an epoxide of the formula (IV) 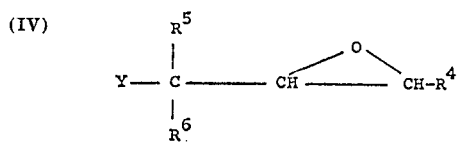

(Y is chlorine or bromine), to obtain a product of the formula (V) 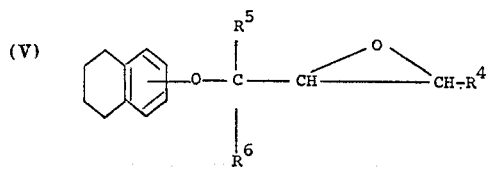

By refluxing the compound of Formula V with an unsubstituted or substituted adamantylamine of the formula (VI) 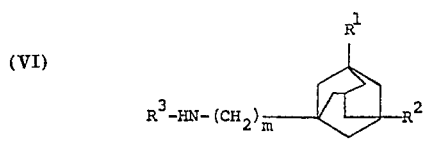

in an inert organic solvent such as n-propanol, benzene or toluene, e.g., for about 16 to 24 hours, yields a product of Formula I wherein $R^7$ is hydrogen. The ester, i.e., wherein $R^7$ is acyl, is obtained by esterifying the product of the foregoing procedure with the appropriate hydrocarbon carboxylic acid, e.g., by refluxing the alcohol (Formula I wherein $R^7$=H) with the appropriate acid in a solvent like methylene or ethylene chloride using a trace of sulfuric, aryl sulfonic acid or borontrifluoride as catalyst. In an alternate procedure, the alcohol is heated with the appropriate acid chloride or acid anhydride (obtained from the appropriate hydrocarbon carboxylic acid) in the presence of anhydrous pyridine or sodium acetate.

Examples of such acids include acetic acid, propionic acid, isobutyric acid, hexanoic acid, decanoic acid, benzoic acid, phenylacetic acid, 1-adamantane carboxylic acid, 3-methyl-1-adamantaneacetic acid, etc.

The acid addition salts may be formed as previously described.

As an alternate method, an adamantylamine of Formula VI is reacted with a compound of the formula (VII) 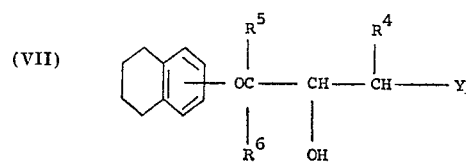

(Y is a halogen, preferably bromine), e.g., by refluxing two equivalents of the compound of Formula VI with one equivalent of VII in an organic solvent such as chloroform, benzene, toluene, or dimethoxyethane for about 6 to 10 hours.

The compounds of Formula VII are prepared by reacting compounds of Formula V with a hydrohalic acid, for examples, hydrobromic acid.

Adamantylamines of Formula VI may be produced by several methods. When $m$ is 0 and $R^3$ is hydrogen, unsubstituted and substituted adamantylamines of the formula (VIII) 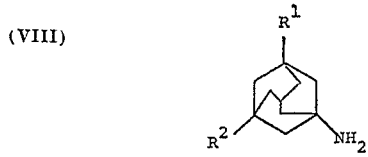

are know, e.g., 1-adamantylamine, 3-methyl-1-adamantylamine, 3-ethyl-1-adamantylamine, 3-methoxy-1-adamantylamine, 3,5 - dimethyl-1-adamantylamine, 3,5-di- methoxy-1-adamantylamine and the like, and may be prepared by known methods. When $m$ is 0 and $R^3$ is other than hydrogen they may be prepared from unsubstituted or substituted adamantylamines of Formula VIII by refluxing the latter with an acid chloride RCOCl or an acid anhydride $(RCO)_2O$. The product of the formula (IX) 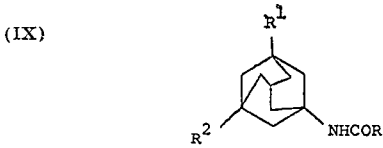

is refluxed in a solvent such as tetrahydrofuran in the presence of a reducing agent such as lithium aluminum hydride to obtain a product of the formula (X) 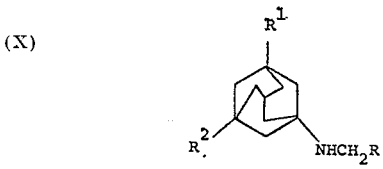

The radical $CH_2R$ is the same as $R^3$.

When $m$ is one, an unsubstituted or substituted adamantanecarboxylic acid, e.g., 1-adamantanecarboxylic acid, 3-methyl-1-adamantanecarboxylic acid, 3-ethyl-1-adamantanecarboxylic acid, 3-methoxy-1-adamantanecarboxylic acid, 3,5 - dimethoxy - 1 - adamantanecarboxylic acid, or the like is converted to the corresponding acid chloride in benzene to obtain a compound of the formula (XI) 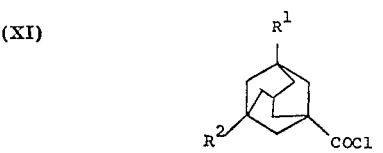

The latter is treated with an amine $R^3$—$NH_2$ to obtain the amide (XII) 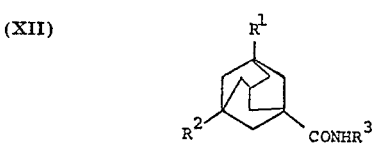

Upon reduction with lithium aluminum hydride in tetrahydrofuran there is obtained (XIII) 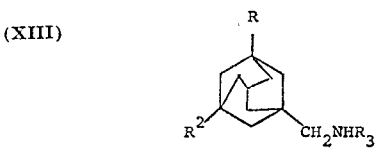

When m is 2, an unsubstituted or substituted 1-bromoadamantane of the formula (XIV) 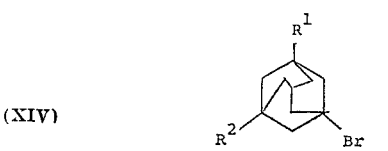

is treated with dichloroethylene and boron trifluoride in an acid such as sulfuric acid to obtain a 1-adamantaneacetic acid of the formula (XV) 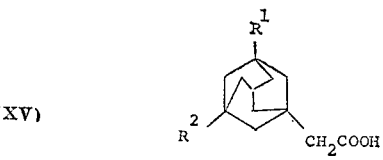

This acid is then processed as described above when $m$ is 1 to give

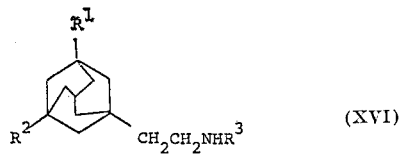

(XVI)

The following examples are illustrative of the invention. All temperatures are on the centigrade scale.

EXAMPLE 1

1-(1-adamantylamino)-3-(5,6,7,8-tetrahydro-1-naphthyloxy)-2-propanol (a) 5,6,7,8-tetrahydro-1-naphthol.—A 3-l. three-necked flask, equipped with a Dry Ice condenser, a sealed Hershberg-type stirrer, and an inlet tube, is set up in a hood and charged with 108 g. (0.75 mole) of α-naphthol. The stirrer is started, and to the rapidly stirred flask contents, is added 1 l. of liquid ammonia as rapidly as possible (about 5 minutes). When the naphthol has gone into solution (about 10 minutes), 20.8 g. (3.0 g. atoms) of lithium metal is added in small pieces and at such a rate as to prevent the ammonia from refluxing too violently. After the addition of the lithium has been completed (about 45 minutes), the solution is stirred for an additional 20 minutes and is then treated with 170 ml. (3.0 moles) of absolute ethanol which is added dropwise over a period of 30–45 minutes. The condenser is removed, stirring is continued, and the ammonia is evaporated in a stream of air introduced through the inlet tube. The residue is dissolved in 1 l. of water, and, after the solution has been extracted with two 100 ml. portions of ether, it is carefully acidified with concentrated hydrochloric acid. The product formed is taken into ether with three 250-ml. extractions, and then the ether extract is washed with water and dried over anhydrous sodium sulfate. The ether is removed by evaporation to yield 106–108 g. (97–99%) of crude 5,8-dihydro-1-naphthol, M.P. 69–72°. This material is dissolved in 250 ml. of ethyl acetate and hydrogenated with 3.0 g. of 10% palladium on charcoal catalyst at 2–3 atm. pressure in a Parr apparatus until the theoretical amount of hydrogen has been absorbed (about 45 minutes). The catalyst is removed by filtration, and the solvent is removed by distillation to leave 105–107 g. of an oil which quickly solidifies, M.P. 67–69.5°. Recrystallization of the 5,6,7,8-tetrahydro-1-naphthol from 250 ml. of petroleum ether (B.P. 88–98°) gives 93–97 g. (84–88%) of almost colorless crystals, M.P. 68–68.5°.

(b) 1-(2-,3-epoxypropoxy)-5,6,7,8-tetrahydronaphthalene.—To a cooled solution of 14.89 g. of 5,6,7,8-tetrahydro-1-naphthol and in 40 ml. of p-dioxane, 8.2 g. of epichlorhydrin are added, followed by the dropwise addition of a solution of 4.95 g. of sodium hydroxide in 10 ml. of water. The yellow reaction mixture is refluxed for three hours. After cooling, the solvent is removed in vacuo, and the residue extracted with benzene. The extracts are combined, washed with water and dried ($MgSO_4$). The residue obtained after removing the solvent is distilled in vacuo to give 13.4 g. of 1-(2,3-epoxypropoxy)-5,6,7,8-tetrahydronaphthalene, B.P. 115–123°/0.5–0.55 mm.

τ $CDCl_3$, 2.8–3.6 (m, 3, aromatic protons), 5.7–6.3 (m, C—$OCH_2$), 6.6–6.9 (m, CH), 7.1–7.45 (m, 6H), 8.3–8.4 (m, 4H).

(c) 1-(1-adamantylamino) - 3 - (5,6,7,8-tetrahydro-1-naphthyloxy)-2-propanol.—A solution of 3.0 g. of 1-(2,3-epoxypropoxy-5,6,7,8-tetrahydronaphthalene and 5.09 g. of 1-aminoadamantane in 100 ml. of toluene is refluxed for an oil bath at a bath temperature of 135–150° for 20 hours. Evaporation of the solvent in vacuo gives a thick liquid which solidifies slowly on trituration with dry ether to give 2.89 g. of a white solid. It is recrystallized twice from acetonitrile to give 1-(1-adamantylamino)-3-(5,6, 7,8-tetrahydro-1-naphthyloxy)-2-propanol as shiny white crystals, M.P. 104–105° (τ $CDCl_3$, 2.8–3.5, 5, 35, 7.1–7.4, 7.8–8.6).

(d) 1-(1-adamantylamino) - 3 - (5,6,7,8-tetrahydro-1-naphthyloxy) - 2 - propanol.—Alternate method—from 1-chloro-3-(5,6,7,8 - tetrahydro-1-naphthyloxy)-2-propanol:

A solution of 1.18 g. of 1-chloro-3-(5,6,7,8-tetrahydro-1-naphthyloxy)-2-propanol and 4.5 g. of 1-aminoadamantane in 20 ml. of benzene is refluxed for 16 hours. The solvent is removed in vacuo, the residue is dissolved in water, made basic with dilute sodium hydroxide solution and extracted with chloroform. The residue obtained after removal of chloroform is crystallized from acetonitrile to give 1-(1-adamantylamino)-3-(5,6,7,8-tetrahydro-1-naphthyloxy)-2-propanol.

Following the procedure of Example 1, but substituting for the 1-aminoadamantane of part c, the substituted 1-aminoadamantane indicated in the second column (and substituting 2-naphthol for 1-naphthol in Examples 3, 6, 7 and 8) there is obtained 1-[3-$R^1$, 5-$R^2$-(1-adamantylamino)]-3-[5,6,7,8-tetrahydro-1 (or 2)-naphthyloxy)]-2-propanol wherein $R^1$ and $R^2$ represent the substituents on the adamantyl ring.

| Example | 5,6,7,8-tetrahydronaphthol | 1-amino-3-$R_1$,5-$R_2$-adamantane |
|---|---|---|
| 2 | 5,6,7,8-tetrahydro-1-naphthol | 1-amino-3-methyladamantane. |
| 3 | 5,6,7,8-tetrahydro-2-naphthol | 1-amino-3-methoxyadamantane. |
| 4 | 5,6,7,8-tetrahydro-1-naphthol | 1-amino-3,5-diethyladamantane. |
| 5 | do | 1-amino-3,5-dimethoxyadamantane. |
| 6 | 5,6,7,8-tetrahydro-2-naphthol | 1-amino-3-butyladamantane. |
| 7 | do | 1-amino-3,5-dimethyladamantane. |
| 8 | do | 1-amino-3-methyladamantane. |

Each of the propanols of Examples 2 to 8 is esterified with acetic anhydride as described in Example 29 below to obtain the acetic acid ester of each.

The propionic acid ester of each of the products of Examples 2 to 8 is obtained by refluxing in benzene the product obtained above with an equivalent of propionyl chloride in the presence of an equivalent of pyridine for one to four hours. The reaction mixture is evaporated to dryness, the residue is taken up in chloroform and recrystallized from acetone.

The decanoic ester and phenyl acetic acid ester of each of the products of Examples 2 to 8 are similarly obtained by substituting decanoyl chloride or phenacetyl chloride, respectively, for the propionyl chloride.

Following the procedure of Example 1, but substituting for the 1-(2,3-epoxypropoxy)-5,6,7,8-tetrahydronaphthalene in part b; the substituted compound of the following formula, there is obtained the substituted 1-(1-adamantylamino)-3-(5,6,7,8 - tetrahydro-1-naphthyloxy)-2-propanol having the same substituents $R^3$, $R^4$, $R^5$ and $R^6$.

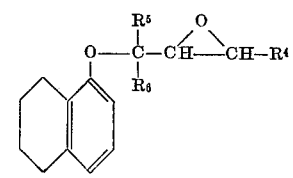

| Example | $R_4$ | $R_5$ | $R_6$ |
|---|---|---|---|
| 9 | H | $CH_3$ | $CH_3$ |
| 10 | H | $C_2H_5$ | H |
| 11 | $CH_3$ | H | H |
| 12 | $CH_3$ | $CH_3$ | $CH_3$ |
| 13 | $CH_3$ | $C_2H_5$ | H |

EXAMPLE 14

1-(1-adamantylmethylamino)-3-(5,6,7,8-tetrahydro-1-naphthyloxy)-2-propanol (a) 1-adamantane carboxylic acid chloride.—To 18 g. of 1-adamantane carboxylic acid, 50 ml. of thionyl chloride is added with cooling, and the mixture is heated under reflux for 30 minutes. The excess of thionyl chloride is removed in vacuo, the addition of 2× 30 ml. of dry benzene (benzene dried over silica gel) and evaporation serving to remove the last traces. Anhydrous ether (30 ml.) is added and the solution is evaporated, leaving 1-adamantanecarboxylic acid chloride as a brownish white solid;

$$\lambda_{max.}^{Nujol} \; 5.61 \; m\mu$$

(c.=0 of acid chloride).

(b) 1 - adamantanecarboxamide.—1 - adamantanecarboxylic acid chloride (35 g.) dissolved in 70 ml. of dry tetrahydrofuran, is added to a well-cooled aqueous ammonia solution. A white precipitate appears and the mixture is then stirred for 0.5 hour. The precipitate is filtered, washed with water to neutrality and dried over phosphorous pentoxide in vacuo to give 1-adamantanecarboxamide; M.P. 186–187.5°;

$$\lambda_{max.}^{Nujol} \; 5.95 \; m\mu \; (c.=0 \; of \; amide)$$

(c) 1-adamantylmethylamine.—To a well stirred suspension of 30 g. of lithium aluminum hydride in 1000 ml. of dry ether, 27 g. (0.15 mole) of 1-adamantanecarboxamide is added in portions over a period of 1.5 hour. After the addition, the reaction mixture is stirred at room temperature for 1 hour and then is refluxed with stirring for four hours and finally is allowed to stand overnight at room temperature. The suspension is well-cooled and 50 ml. of water is added dropwise with vigorous stirring. This is followed by the addition of 100 ml. of 10% sodium hydroxide solution. The ethereal layer is separated and the solid is extracted three times with ether. The combined ethereal layer is dried (MgSO$_4$) and evaporated in vacuo to give 1-adamantylmethylamine as a pale yellow liquid.

(d) 1 - (1-adamantylmethylamino)-3-(5,6,7,8-tetrahydro-1-naphthyloxy)-2-propanol.—Following the procedure of Example 1, but substituting 1-adamantylmethylamine for the 1-aminoadamantane in part (c) or (d), 1-(1 - adamantylmethylamino) - 3 - (5,6,7,8 - tetrahydro-1-naphthyloxy)-2-propanol is obtained.

Similarly, by utilizing the following (3-R$^1$, 5-R$^2$-1-adamantyl)methylamine, produced as in parts a, b and c above, instead of 1-adamantylmethylamine, the corresponding 1 - [3-R$^1$, 5 - R$^2$] - 1 - adamantylmethylamino)-3-(5,6,7,8-tetrahydro-1-naphthloxy)2-propanol is obtained:

| Example | R$^1$ | R$^2$ |
| --- | --- | --- |
| 15 | H | CH$_3$ |
| 16 | H | OCH$_3$ |
| 17 | H | C$_2$H$_5$ |
| 18 | OCH$_3$ | OCH$_3$ |
| 19 | H | C$_4$H$_9$ |
| 20 | CH$_3$ | CH$_3$ |

EXAMPLE 21

1-(N-ethyl-1-adamantylethylamino)-3-(5,6,7,8-tetrahydro-1-naphthyloxy)-2-propanol (a) 1-adamantaneacetic acid.—A solution of 25 g. of 1-bromoadamantane in 100 g. of dichloroethylene is added dropwise during 1.5 hour to 100 ml. of sulfuric acid (90%) containing 18 g. of boron trifluoride at 8–10°. After stirring for three hours at 10°, crushed ice is gradually added, and the mixture is diluted with water. The crude precipitate (26.5 g.) is dissolved in 10% sodium hydroxide solution, and the cloudy solution is extracted once with ether. The basic solution is cooled, and acidified with 5% hydrochloric acid. The 1-adamantaneacetic acid that precipitates is collected and dried to give 21.5 g. of white solid, M.P. 130–133°. The analytical sample crystallizes from methanol-water as long white needles, M.P. 134–136°.

(b) 1-adamantaneacetic acid chloride.—To 39 g. of 1-adamantaneacetic acid, 100 ml. of thionyl chloride is added with cooling, and the mixture is heated under reflux for 0.5 hour. The excess of thionyl chloride is removed in vacuo, the addition of 2× 50 ml. of dry benzene and evaporation serving to remove the last traces, yielding 1-adamantaneacetic acid chloride, $$\lambda_{max.}^{Nujol} \; 5.6 \; m\mu$$

(c) 1-adamantaneacetamide.—A solution of 1-adamantaneacetic acid chloride (40 g.) dissolved in 75 ml. of dry tetrahydrofuran, is added to a well cooled aqueous ammonia solution. A white precipitate appears and the mixture is then stirred for 0.5 hour. The precipitate is filtered, washed with water to neutrality, and dried over phosphorous pentoxide in vacuo to give 1-adamantaneacetamide as white crystals, M.P. 166–168°;

$$\lambda_{max.}^{Nujol} \; 5.9 \; m\mu$$

(d) 1-adamantaneethylamine.—To a well-stirred suspension of 20 g. of lithium aluminum hydride in 500 ml. of dry tetrahydrofuran, 35 g. of 1-adamantaneacetamide dissolved in 1000 ml. of dry tetrahydrofuran is added in portions over a period of 1.5 hour. After the addition, the reaction mixture is stirred at room temperature for 1 hour, and then is refluxed with stirring for four hours, and finally is allowed to stand overnight at room temperature. The suspension is well-cooled and 50 ml. of water is added dropwise with vigorous stirring. This is followed by the addition of 100 ml. of 10% sodium hydroxide solution. The organic layer is separated and the solid is extracted three times with ether. The combined organic layer is dried (MgSO$_4$) and evaporated in vacuo to give 24 g. of 1-adamantaneethylamine as a pale yellow liquid. It may be identified as its hydrochloride which separates as white crystals from methanol-ether, M.P. over 280°.

(e) N-[2-(1-adamantyl)ethyl]acetamide.—To a solution of 5 g. of 1-adamantaneethylamine in 100 ml. of benzene and 2.5 g. of pyridine, 2.4 g. acetyl chloride is added dropwise with cooling. After refluxing for 0.5 hour, the mixture is poured onto 100 ml. of cold water, and the benzene layer is separated. The aqueous layer is extracted once with benzene, and the combined benzene layer is washed successively with water, 5% sodium carbonate solution, 1 N hydrochloric acid, and water. After drying, the benzene layer is evaporated in vacuo to give a thick oil. Trituration with pentane yields N-[2-(1-adamantyl) ethyl]acetamide as a white solid, M.P. 100–103°. An analytical sample is obtained by two crystallizations from ether, M.P. 114–116°.

(f) N - ethyl - 1 - adamantaneethylamine.—Using the procedure of part (d) above, but substituting N-[2-(1 - adamantyl)ethyl]acetamide for 1 - adamantaneacetamide, N-ethyl-1-adamantaneethylamine is obtained. It may be identified as its hydrochloride, which separates as white crystals from acetonitrile, M.P. over 280°.

(g) 1 - (N-ethyl-1-adamantylethylamino) - 3 - (5,6,7,8-tetrahydro-1-naphthyloxy) - 2 - propanol.—Following the procedure of Example 1, but substituting N-ethyl-1-adamantylethylamine for the aminoadamantane in part (c) or (d), 1-(N-ethyl-1-adamantylethylamino)-3-(5,6,7,8-tetrahydro-1-naphthyloxy)-2-propanol is obtained.

Similarly, by utilizing the following substituted 3-R$^1$, 5-R$^2$-1-bromoadamantanes in place of 1-bromoadamantane in part (a) above and continuing as described, the correspondingly substituted 1-[N-ethyl-2-(3-R$^1$, 5-R$^2$-1-adamantyl)ethylamino]-3-(5,6,7,8-tetrahydro - 1 - naphthyloxy)-2-propanol is obtained.

| Example | R¹ | R² |
|---|---|---|
| 22 | H | CH₃ |
| 23 | H | OCH₃ |
| 24 | C₂H₅ | C₂H₅ |
| 25 | OCH₃ | OCH₃ |
| 26 | H | C₄H₉ |
| 27 | CH₃ | CH₃ |

Further by utilizing 5,6,7,8-tetrahydro-2-naphthol in place of 5,6,7,8-tetrahydro-1-naphthol in the foregoing procedure the correspondingly substituted 1-[N-ethyl-2-(3-R¹, 5-R²-1-adamantyl) - ethylamino-3-(5,6,7,8-tetrahydro-2-naphthyloxy)-2-propanol is obtained.

EXAMPLE 28

1-(1-adamantylamino)-3-(5,6,7,8-tetrahydro-1-naphthyloxy)-2-propanol hydrochloride Dry hydrochloride gas is introduced into a solution of 1 g. of 1-(1-adamantylamino)-3-(5,6,7,8-tetrahydro-1-naphthyloxy)-2-propanol in 200 ml. of dry ether. The precipitate is collected and the hydrochloride is crystallized from alcohol-ether.

EXAMPLE 29

1-(1-adamantylamino)-3-(5,6,7,8-tetrahydro-1-naphthyloxy)-2-propyl acetate

A mixture of 3 g. of 1-(1-adamantylamino)-3-(5,6,7,8-tetrahydro-1-naphthyloxy)-2-propanol, 1.5 g. of fused sodium acetate and 15 ml. of acetic anhydride is heated on a steam bath with occasional shaking for 1 hour. At the end of this time the warm solution is poured with vigorous stirring into 100 ml. of ice-water. The mixture is stirred for 10–15 minutes and the crystals of 1-(1-adamantylamino)-3-(5,6,7,8-tetrahydro-1-naphthyloxy) - 2 - propyl acetate are collected, washed thoroughly with water, and purified by crystallization from alcohol.

EXAMPLE 30

1-(N-β-hydroxyethyl-1-adamantylamino)-3-(5,6,7,8-tetrahydro-1-naphthyloxy)-2-propanol Following the procedure for Example 1, but substituting N-β-hydroxyethyl - 1 - adamantylamine for 1-aminoadamantane in part (c) or (d), the above product is obtained.

EXAMPLE 31

1-(N-allyl-1-adamantylamino)-3-(5,6,7,8-tetrahydro-1-naphthyloxy)-2-propanol

Following the procedure of Example 1, but substituting N-allyl-1-adamantylamine for 1-aminoadamantane, in part (c) or (d), the above product is obtained.

EXAMPLE 32

1-(N-benzyl-1-adamantylamino)-3-(5,6,7,8-tetrahydro-1-naphthyloxy)-2-propanol

Following the procedure of Example 1, but substituting N-benzyl-1-adamantylamine for 1-adamantane, in part (c) or (d), the above product is obtained.

What is claimed is:
1. A compound of the formula

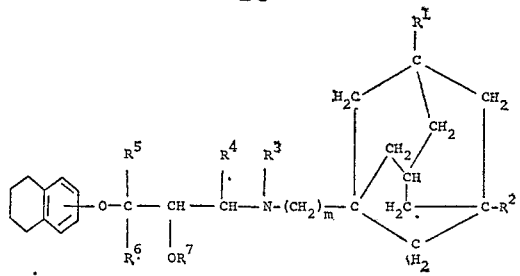

wherein

R¹ and R² each is hydrogen, lower alkyl or lower alkoxy.
R³ is hydrogen, lower alkyl, hydroxy-lower alkyl, lower alkenyl or phenyl-lower alkyl,
R⁴, R⁵ and R⁶ each is hydrogen or lower alkyl,
R⁷ is hydrogen or the acyl radical of a hydrocarbon carboxylic acid of less than 14 carbon atoms, and
m is 0, 1 or 2, and acid addition salts thereof.

2. A compound as in claim 1 wherein R¹ to R⁶ are all hydrogen, m is 0 and R⁷ is lower alkanoyl.
3. A compound as in claim 1 wherein R¹ to R⁶ are all hydrogen, m is 1 and R⁷ is lower alkanoyl.
4. A compound as in claim 1 wherein R¹ to R⁶ are all hydrogen, m is 2 and R⁷ is lower alkanoyl.
5. A compound as in claim 1 wherein R² to R⁷ are all hydrogen, m is 0 and R¹ is lower alkyl.
6. A compound as in claim 1 wherein R¹ to R⁷ are all hydrogen, m is 0 and the attachment is in the 1-position.
7. Acid addition salt of the compound of claim 6.
8. A compound as in claim 7 wherein the salt is the hydrochloride.
9. A compound as in claim 1 wherein R¹ to R⁷ are all hydrogen, m is 1 and the attachment is in the 1-position.
10. A compound as in claim 1 wherein R¹, R², R⁴ to R⁷ are all hydrogen, m is 2, R³ is ethyl and the attachment is in the 1-position.
11. A compound in claim 2 wherein the lower alkanoyl group is acetyl and the attachment is in the 1-position.
12. A compound as in claim 1 wherein R¹, R² and R⁴ to R⁷ are all hydrogen, R³ is β-hydroxyethyl, m is 0 and the attachment is in the 1-position.
13. A compound as in claim 1 wherein R¹, R² and R⁴ to R⁷ are all hydrogen, R³ is allyl, m is 0 and the attachment is in the 1-position.

References Cited

UNITED STATES PATENTS

| 3,337,628 | 8/1967 | Crowther et al. | 260—570.7 |
| 3,415,873 | 12/1968 | Stevens | 260—501.18 |
| 3,432,545 | 3/1969 | Howe | 260—570.7 |
| 3,463,808 | 8/1969 | Bond | 260—490 |
| 3,476,767 | 11/1969 | Bencze | 260—570.7 |
| 3,501,769 | 3/1970 | Crowther et al. | 260—501.17 |
| 3,520,919 | 7/1970 | Crowther et al. | 260—501.17 |
| 3,538,150 | 11/1970 | Gilman et al. | 260—501.17 |

JAMES A. PATTEN, Primary Examiner
V. GARNER, Assistant Examiner

U.S. Cl. X.R.

252—175, 392; 260—343.7, 348, 404 468 B, 476 C, 490, 501.18, 501.19, 514 B, 544 R, 557 B, 561 R, 563 P, 570.5 CA, 570.7, 613 D; 424—199, 280, 308 311, 312, 325